Patented June 27, 1939

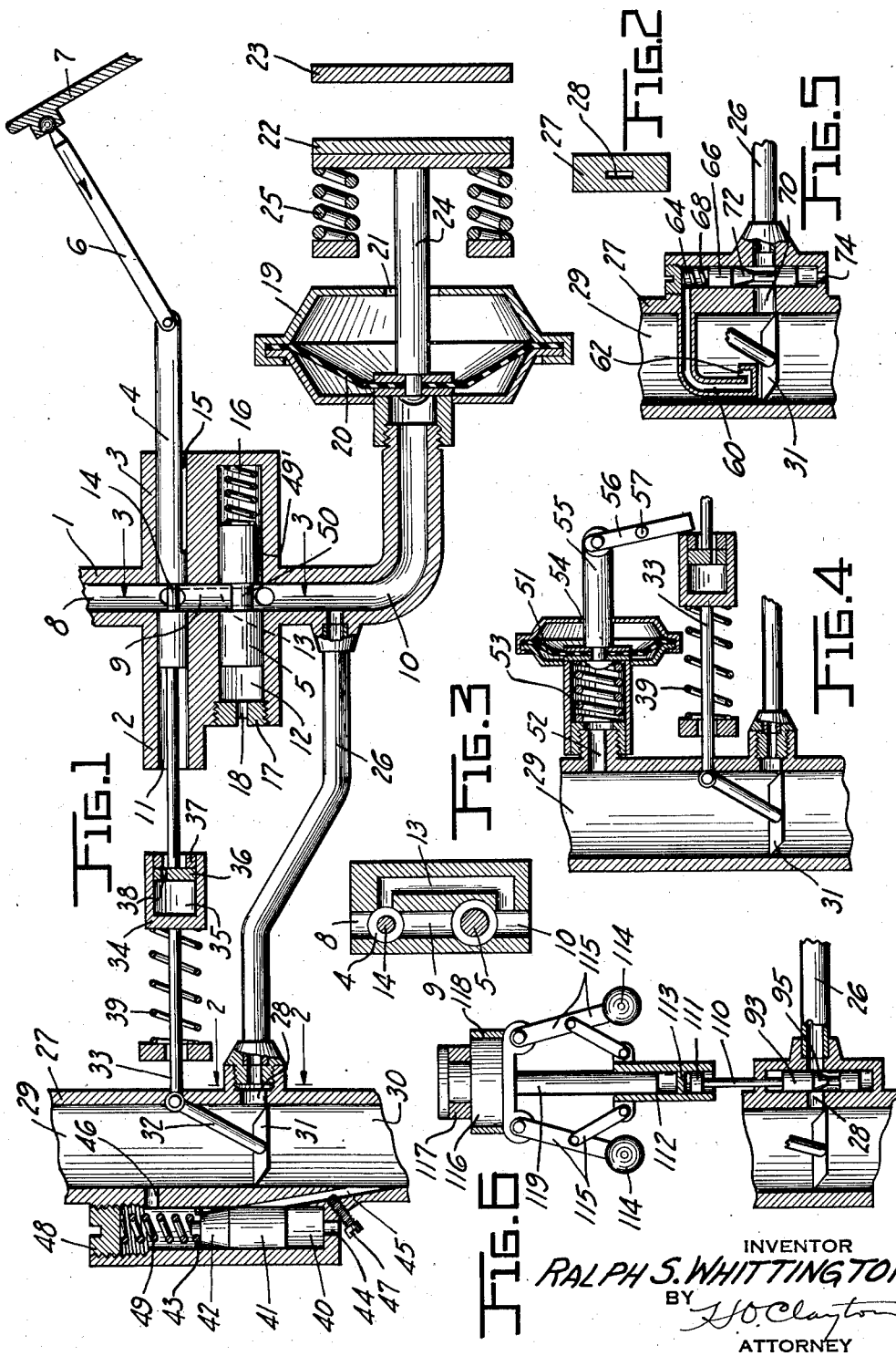

2,163,903

UNITED STATES PATENT OFFICE 2,163,903

AUTOMATIC CONTROL OF CLUTCH AND THROTTLE ACTUATION OF AN AUTOMOTIVE VEHICLE

Ralph S. Whittington, Springfield, Mass., assignor to Bendix Products Corporation, South Bend, Ind., a corporation of Indiana Original application July 15, 1932, Serial No. 622,703. Divided and this application November 1, 1937, Serial No. 172,169

1 Claim. (Cl. 192—.01)

This invention relates to an automatic control means for use in controlling the actuation of throttle and clutch of an automotive vehicle in their proper relation.

One of the primary objects of this invention is to provide a control means of the above-mentioned character which will automatically control the disengagement and engagement of the clutch plates, and also control automatically the acceleration of the motor during the period that the clutch plates are contacting.

A further object of this invention is to provide a control means of the above-mentioned character which will effect a slower contacting of the clutch plates after the vehicle has been free-wheeling or coasting for a time than is obtained when the gears of the transmission are being normally shifted and the accelerator depressed to drive the vehicle.

This invention further contemplates the provision of means whereby the motor may be accelerated more in advance of the contacting of the clutch plates when the accelerator is depressed rapidly as compared to depressing the accelerator slowly.

Still further this invention contemplates the provision of a control means of the above-mentioned character which will allow the clutch plate pressure to increase or decrease accordingly as the accelerator is depressed or released during the range of clutch engagement.

This invention also provides means effecting a slower final contacting of the clutch plates at slow motor speeds than at higher motor speeds, when the accelerator is depressed rapidly.

Other objects of the invention and desirable details of construction and combinations of parts will become apparent from the following detailed description of certain embodiments of the invention, taken in conjunction with the accompanying drawing, in which:

Figure 1 is a semi-diagrammatic view, partly in section, of a control means constructed in accordance with this invention;

Figure 2 is a fragmentary cross-sectional view taken substantially on the line 2—2 of Figure 1;

Figure 3 is a fragmentary cross-sectional view taken substantially on the line 3—3 of Figure 1;

Figure 4 is a semi-diagrammatic view, partly in section, of a method optional to the one illustrated in Figure 1, of controlling the acceleration of the motor during clutch contacting;

Figure 5 is a semi-diagrammatic view, partly in section, of a portion of a control means to be used in connection with a system as illustrated in Figure 1; and Figure 6 is a view, partly in section, of a portion of a control means to be used in connection with a system as illustrated in Figure 1.

In general, this invention provides an automatic control means for the clutch of an automotive vehicle which also accelerates the motor automatically at the instant that the clutch begins to engage. In prior devices of this nature this has been accomplished by means of mechanical connection to the accelerator pedal of such kind that the carburetor throttle valve would be opened the proper amount at the time the clutch started engagement. However, this has been a delicate adjustment and one that required frequent adjustment to secure the proper relation of the throttle valve setting and the beginning of clutch plate contact.

This invention further provides a means of securing the proper clutch plate contact after the vehicle has been free-wheeling or coasting with the clutch disengaged, and the motor is accelerated to drive the vehicle again. The conditions encountered at this time are entirely different from those encountered while shifting the gears of the transmission and accelerating the motor to drive the car again, for at this time the motor is still revolving at several hundred revolutions per minute, and after the gears have been shifted and the accelerator depressed again, the motor will pick up speed very rapidly. But after the car has been coasting for a time, the motor has had time to slow down to a low speed and is idling. Then when the accelerator is depressed again to drive the car, the motor speed must necessarily require more time to come up to the speed of the car than in the former case where the motor is already turning rapidly. The result is that after free-wheeling, the clutch will engage before the motor comes up to the speed of the car, and a jerk is felt as the motor is brought up to speed. This invention provides means of delaying clutch engagement until the motor comes up to speed, after the car has been free-wheeling, without slowing up the clutch engagement during the shifting of the gears.

This invention also provides a method of contacting the clutch plates under full control of the accelerator pedal position, giving the operator of the vehicle better control while maneuvering the car in close quarters.

Referring then to the drawing, wherein like reference characters designate corresponding parts through all views, there is shown in Figure 1 a system composed of a conduit 1 adapted to be connected to the intake manifold of the motor of an automotive vehicle. Conduit 1 is provided with lateral extensions 2 and 3, which slidably receive piston 4 and valve 5. Piston 4 is connected by linkage 6 to accelerator pedal 7. The conduit 1 is divided into passages 8, 9 and 10 by piston 4 and valve 5. Piston 4 operates in bore 11 to control the communication of passages 8 and 9. Valve 5 operates in bore 12 to control communication between passages 9 and 10. Passage 13 is provided to place passage 8 in communication with passage 10 only at such times that the reduced portion 14 of piston 4 is in alignment with passage 8, as shown in Figure 1, which corresponds to the position of complete release of the accelerator. Piston 4 is also provided with groove 15 adapted to place passage 9 in communication with the atmosphere upon a predetermined movement of piston 4. Valve 5 is actuated by spring 16 and is held in bore 12 by plug 17. Hole 18 opens bore 12 to the atmosphere. Conduit 1 terminates in diaphragm casing 19, placing one side of diaphragm 20 in communication with passage 10. Diaphragm 20 is exposed on its other face to atmospheric pressure through port 21 and is connected to the clutch plate 23 by stem 24. Clutch plate 22 is moved to contact clutch plate 23 by clutch springs 25. Tapped into the passage 10 is the conduit 26, which at its other end is tapped into the carburetor riser 27 at the rectangular port 28. Carburetor riser 27 is divided into passage 29 and passage 30 by carburetor throttle valve 31. Passage 29 is adapted to be connected to the intake manifold of the motor of the vehicle, and passage 30 is adapted to be connected to the carburetor. Carburetor throttle valve 31 is actuated by arm 32, which is linked to the accelerator by rod 33 and piston 4. Rod 33 is provided with the enlarged portion 34 which contains the bore 35 in which the piston 36 is slidably mounted. Piston 36 is formed from an extension of piston 4 and is held in bore 35 by ring 37 pressed into bore 35. Piston 36 is provided with the small hole 38 to open bore 35 to atmosphere. Spring 39 is provided to actuate the throttle valve in opposition to the accelerator pedal. Carburetor riser 27 also contains the bore 40, which slidably receives piston 41 provided with taper 42, which is contacted by ring 43 pressed into bore 40 to form a stop for piston 41. Port 44 exposes piston 41 to atmospheric pressure. Passage 45 containing the adjustable restriction 47 places passage 30 in communication with bore 40, and port 46 communicates between bore 40 and passage 29. Spring 49 actuates piston 41, and plug 48 closes bore 40.

In the operation of the system, passage 8 is subject to the vacuum in the intake manifold, and all parts are shown in Figure 1 in the position they occupy while the motor idles. Vacuum from passage 8 first acts through passage 13, groove 49' of valve 5, allowing atmospheric pressure acting through hole 18 to overcome spring 16 and place valve 5 in the position shown in Figure 1. Then by virtue of the reduced portion 50 of valve 5, diaphragm 20 is placed in direct communication with passage 8, allowing atmospheric pressure acting through port 21 on diaphragm 20 to overcome clutch springs 25 and move the clutch plates to the position shown in Figure 1. The gears of the transmission may now be shifted. When the accelerator pedal 7 is depressed, piston 4 is moved in the direction of the arrow to cut off vacuum in passage 8 from passage 9 and passage 13, and at approximately the same time place passage 8 in communication with the atmosphere through groove 15 in piston 4. As air is admitted to passage 9, it passes valve 5 by virtue of the reduced portion 50 and enters diaphragm casing 19 to begin to equalize atmospheric pressure acting on diaphragm 20, but by virtue of clutch springs 25 pulling on diaphragm 20, a vacuum sufficient to overcome spring 16 acting to close valve 5 is developed in passage 10 as the clutch plates move toward engagement.

As soon, however, as the clutch plates begin to contact, the pull of the clutch springs on diaphragm 20 will decrease, causing a drop in vacuum in passage 10. This drop in vacuum will be communicated to the exposed area of valve 5, and spring 16 is of such strength that valve 5 is moved to close passage 9 from passage 10 at some predetermined clutch plate pressure, and further engagement of the clutch must be effected by atmosphere entering passage 10 through port 28 and conduit 26.

The operation described above takes place when the accelerator pedal 7 is depressed just enough to move piston 4 to shut off vacuum in passage 8 and open passage 9 to the atmosphere through groove 15 in piston 4. While the accelerator pedal is in this position, the throttle valve 31 has moved only slightly and port 28 is still exposed largely to vacuum in passage 29. Hence vacuum will still exist in conduit 26. This vacuum will be transferred to conduit 10 and the clutch actuating member 20. However, regardless of the degree of vacuum at port 28, the vacuum at passage 10 cannot, while piston 4 opens passage 9 to atmosphere, exceed the vacuum at which valve 5 will allow atmospheric pressure acting through hole 18 to overcome spring 16 and thus admit more atmosphere from passage 9. Thus valve 5 at this stage acts as a vacuum regulating valve and insures that the clutch will remain partially engaged as long as atmospheric pressure exists in passage 9.

Passage 10 communicates with the carburetor riser through conduit 26 and port 28, which is rectangular in shape but narrow enough to have the proper restriction of its capacity. Port 28 is arranged so that all of its area is exposed to vacuum in passage 29, when the accelerator pedal 7 is completely released, and the throttle valve is in the position shown in Figure 1. However, as the throttle valve is opened, more of the area of port 28 is exposed to near atmospheric pressure in passage 30. The result is that as the throttle valve 31 is opened its edge passes over the face of port 28, producing a continuous drop in vacuum in the conduit 26, and this action results in atmosphere being admitted to passage 10 and diaphragm 20 from passage 30 as the above action takes place. Thus the pressure in passage 10 depends on the proportionate amount of the area of port 28 that is exposed to the vacuum in passage 29 and near atmospheric pressure in passage 30, and the vacuum acting on diaphragm 20, and consequently the clutch plate pressure, can be increased or decreased accordingly as valve 31 is opened or closed. Complete clutch engagement will be obtained when port 28 is completely exposed to near atmospheric pressure in passage 30.

When the accelerator pedal 7 is depressed slowly, as when starting the vehicle, air passes through hole 38 from bore 35 fast enough to prevent the compression of spring 39 and the motion of the throttle valve 31 until piston 36 reaches the bottom of bore 35. At approximately the same time, piston 4 begins admitting atmosphere to diaphragm 20. The result is that the motor begins to accelerate as the clutch begins to engage. But when the accelerator pedal 7 is depressed rapidly, as after free-wheeling, air is compressed in bore 35 due to the limited capacity of hole 38, and spring 39 is compressed, resulting in the opening of the throttle valve 31 more in advance of clutch engagement.

During the normal idling of the motor, the vacuum in passage 29 acting through port 46 on piston 41 overcomes spring 49 and holds piston 41 against ring 43, as shown in Figure 1, due to atmospheric pressure acting through port 44. But at the instant that the clutch plates begin to contact, there is a drop in vacuum in the intake system of the motor and in passage 29. The drop in vacuum referred to occurs as the clutch begins to engage, because at this time the motor begins to develop torque. As the motor is loaded more, the vacuum in the intake system will decrease and can be made to decrease to a negligible quantity, as when the throttle valve is open wide at low motor speeds. This drop in vacuum begins to equalize atmospheric pressure on piston 41 and allows spring 49 to move piston 41 to uncover passage 45 and admit mixture from passage 30, through passage 45 to bore 40 and through port 46 to the intake system of the motor. Piston 41 is provided with taper 42 so that the greater the drop in vacuum in the intake system during the contacting of the clutch plates, the greater the rate at which mixture is admitted to the intake system to accelerate the motor. Thus a means of accelerating the motor automatically as the clutch begins to engage is provided, and the amount that the motor is accelerated increases as the speed of clutch engagement increases, since the vacuum will drop more in the intake system of the motor when the clutch is engaged more rapidly.

Figure 4 illustrates an alternate method of automatically accelerating the motor as the clutch engages, when incorporated in the system illustrated in Figure 1. During the normal idling of the motor, vacuum in passage 29 acting on diaphragm 51 through port 52 overcomes spring 53, due to atmospheric pressure acting on the opposite face of diaphragm 51 through port 54, and holds stem 55 in the position shown in Figure 4. Lever 56 is attached to stem 55 and pivots at 57. It is arranged to actuate throttle valve control rod 33 in opposition to spring 39 and open throttle valve 31. The drop in vacuum in passage 29, at the beginning of clutch engagement, begins to equalize atmospheric pressure acting on diaphragm 51 and allows spring 53 to move stem 55 and lever 56 to operate control rod 33 and open throttle valve 31. This admits more mixture from the carburetor and speeds up the motor as the clutch begins to engage.

In Figure 5 is illustrated a method of automatically controlling the capacity of the conduit 26 in a system as illustrated in Figure 1. This system can be used in any clutch control that uses an atmospheric bleed to complete the clutch engagement. In its operation in connection with a system as illustrated in Figure 1, the carburetor riser 27 is adapted to be connected to the intake system, and the carburetor throttle valve 31 divides the carburetor riser into passage 29, which communicates with the intake system, and passage 30, which is adapted to be connected to the carburetor. The conduit 60 is mounted in the interior of the carburetor riser and its open end 62 communicates with passage 29 just above the throttle valve and points in the direction of the flow of gases in the riser. The other end of conduit 60 communicates with a bore 64, which slidably receives a piston 66. Spring 68 actuates piston 66 to reduce the capacity of port 70 and conduit 26. Taper 72 is provided on the piston 66 to vary the restriction of port 70.

When the throttle valve 31 is closed, vacuum in passage 29 acts through the conduit 60 and on the piston 66, allowing atmospheric pressure acting through hole 74 to overcome spring 68 and hold piston 66 in the position shown in Figure 5. Also, when the throttle valve 31 is moved past the port 70 slowly, the vacuum in passage 29 is still great enough to hold piston 66 in the position shown (or approximately) in Figure 5 until after the port 70 has been passed by the throttle valve 31.

When, however, the vehicle is at rest and the throttle valve is opened rapidly, the clutch plates will move rapidly toward contact until they have contacted slightly, and the completion of the contacting of the clutch plates will be done gradually by the action of piston 66, since air must move through conduit 26 to complete the clutch engagement. This is true because the drop in vacuum in passage 29 will be great enough to allow spring 68 to move piston 66 to bring taper 72 in register with the port 70, and the greater the drop in vacuum in passage 29 the greater will be the restriction of port 70.

When, however, the throttle valve is opened rapidly with the motor turning rapidly, as when normally shifting the gears, considerable vacuum will exist at port 62 due to the velocity of gases in passage 29. This is true because of the direction port 62 faces, and because of the action of the gases around the throttle valve 31. There are numerous points around the throttle valve and in the intake system generally at which vacuum will exist in increasing amounts as the motor speed is increased with a wide open throttle (or approximately). The strength of spring 68 is such that the above vacuum will hold piston 66 to decrease the restriction of port 70 as compared to the restriction in the former case. Thus it is obvious that by the correct location of port 62 and the correct design of piston 66 and spring 68 and other related parts, the system can be made to allow a slower final contacting of the clutch plates when the throttle valve is opened rapidly and the motor is turning slowly than under the same conditions with the motor turning rapidly, and that the faster the motor is turning the faster the final engagement of the clutch will be made. It is also obvious that the same principle could be applied to other systems employing an atmospheric bleed to complete the clutch engagement, such as a system employing an accelerator controlled bleed to the atmosphere. Likewise a centrifugal device could be used to increase the restriction of the port 70 as the motor speed increases.

Such a device is shown in Figure 6 and is to be used in connection with a system as illustrated in Figure 1. In this control means, the valve 93 controls communication between the port 28 and the conduit 26. The valve 93 is provided with the taper 95, whereby the restriction of port 28 is decreased as the valve 93 moves upward and increases as the valve 93 is moved downward. The valve 93 is further provided with the stem 110 having an enlarged end 111. The end 111 fits in a bore in the member 112 and is held in position by the ring 113, which is pressed into the member 112, causing the valve 93 to move up or down as the member 112 moves, but allowing the member 112 to rotate about the end 111 of stem 110. The governors 114 are pivotably connected to the member 112 by means of arms 115. Likewise, the governors 114 are pivotably connected to the pulley 116, which is supported by the bearing 117 and driven by a belt 118 which is adapted to operate from the motor pump shaft or other convenient means. Integral with the pulley 116 is the guide shaft 119 on which the member 112 reciprocates.

Thus when the motor is not running, or is running at some predetermined slow speed, the governors 114, due to their weight will occupy the position shown in Figure 6. The length of the valve stem 110 will determine the degree of restriction of port 28. Then as the speed of the motor increases, the governors 114, due to their centrifugal force, will move upward. This motion will move valve 93 upward, and due to the taper 95 of valve 93 the restriction of port 28 will be decreased as the motor speed increases. Thus a system is provided in which the capacity of the conduit controlling the final clutch engagement, conduit 26, increases with the motor speed, and hence effects a more rapid clutch engagement as the motor speed increases.

Also, in the operation of a control such as illustrated in Figure 5, the general drop in vacuum in the intake system as the torque developed by the motor increases is a condition favorable to the proper action of this system, since as the clutch begins engaging the motor torque will increase and cause a decrease of vacuum in the intake system, which will automatically tend to soften the completion of clutch engagement.

This system will also assist in securing a better clutch engagement after the vehicle has been free-wheeling or coasting and the motor has been idling, and the accelerator is depressed to drive the vehicle again. This is true because the opening of the throttle under the above conditions will reduce the vacuum acting on the piston 66 sufficiently to close or restrict the port 70 and thus delay the final engagement of the clutch, giving the motor more time to come up to the speed of the vehicle.

The invention heretofore described is disclosed in my Patent No. 2,103,284, granted December 28, 1937, this application constituting a division thereof.

Although this invention has been described in connection with certain specific embodiments, the principles involved are susceptible of numerous other applications that will readily occur to persons skilled in the art. The invention is, therefore, to be limited only as indicated by the scope of the appended claim.

I claim:

In an automatic control means for the clutch of an automotive vehicle, the combination with the intake system, the carburetor riser and throttle valve, and a mechanism for controlling the throttle valve, of a pressure responsive means for releasing the clutch, means providing a passage between said intake system and said pressure responsive means, a main valve in said passage operable to control communication between said passage and said intake system and between said passage and the atmosphere, an auxiliary valve in said passage for closing the passage between atmosphere and said pressure responsive means, means operating, when the aforementioned mechanism is released, to actuate said main valve and said auxiliary valve to provide direct communication between said intake system and said pressure responsive means to release the clutch, means operating upon the actuation of said throttle valve control mechanism to actuate said main valve to close said passage from the intake system and open said passage to the atmosphere whereby said clutch is moved toward engaged position, means operative by conditions accompanying the partial engagement of said clutch to close said auxiliary valve, and a conduit connecting said passage between said auxiliary valve and said pressure responsive means to said carburetor riser through a port, said port having all of its area exposed to vacuum in said intake system when said throttle valve is closed, but allowing its area to be exposed to pressure in said carburetor riser on the opposite side of said throttle valve as said throttle valve is opened, and means controlling the capacity of the path formed by said conduit and said port.

RALPH S. WHITTINGTON.